(12) United States Patent
Jaquette et al.

(10) Patent No.: US 11,194,667 B2
(45) Date of Patent: Dec. 7, 2021

(54) CREATING A RESTORE COPY FROM A COPY OF A FULL COPY OF SOURCE DATA IN A REPOSITORY THAT IS AT A DIFFERENT POINT-IN-TIME THAN A RESTORE POINT-IN-TIME OF A RESTORE REQUEST

(71) Applicant: INTERNATIONAL BUSINESS MACHINES COPORATION, Armonk, NY (US)

(72) Inventors: Glen A. Jaquette, Tucson, AZ (US); Gregory T. Kishi, Oro Valley, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/175,975

(22) Filed: Feb. 7, 2014

(65) Prior Publication Data

US 2015/0227438 A1    Aug. 13, 2015

(51) Int. Cl.
*G06F 11/14*    (2006.01)
*G06F 16/11*    (2019.01)

(52) U.S. Cl.
CPC ...... *G06F 11/1451* (2013.01); *G06F 11/1469* (2013.01); *G06F 16/128* (2019.01)

(58) Field of Classification Search
CPC ............. G06F 11/1446; G06F 11/1448; G06F 11/1451; G06F 11/1458; G06F 11/1459;
(Continued)

(56) References Cited

U.S. PATENT DOCUMENTS 6,594,744 B1    7/2003  Humlicek et al.
6,912,629 B1    6/2005  West et al.
(Continued)

FOREIGN PATENT DOCUMENTS

CN    1071770 A    5/1993
CN    1740981      3/2006
(Continued)

OTHER PUBLICATIONS

Office Action dated Dec. 30, 2015, pp. 36, for U.S. Appl. No. 14/175,964, filed Feb. 7, 2014.
(Continued)

*Primary Examiner* — Ashish Thomas
*Assistant Examiner* — Jedidiah P Ferrer
(74) *Attorney, Agent, or Firm* — Konrad Raynes Davda & Victor LLP; David W. Victor

(57) ABSTRACT

Provided are a computer program product, system, and method for creating a restore copy from a copy of a full copy of source data in a repository that is at a different point-in-time than a restore point-in-time of a restore request. A repository has a full copy of source data as of a full copy point-in-time and for each of a plurality of point-in-time copies at different point-in-times of the source data, change information indicating changed data in the source data that changed between the point-in-time of the point-in-time copy and a subsequent point-in-time, and changed point-in-time data comprising data in the source data as of the point-in-time of the point-in-time copy indicated in the change information as changed. A point-in-time copy of the full copy is created in response to a restore request and returned as a restore copy to the restore request.

24 Claims, 10 Drawing Sheets

(58) Field of Classification Search
CPC .......... G06F 17/30; G06F 17/3007; G06F 17/30088; G06F 2201/84; G06F 11/1469; G06F 16/128

See application file for complete search history.

(56) References Cited

U.S. PATENT DOCUMENTS

| | | |
|---|---|---|
| 7,107,486 B2 | 9/2006 | Okada et al. |
| 7,133,884 B1 | 11/2006 | Murley et al. |
| 7,272,693 B2 | 9/2007 | Ushijima et al. |
| 7,284,104 B1 | 10/2007 | Wu et al. |
| 7,318,134 B1 | 1/2008 | Oliveira et al. |
| 7,529,782 B2 | 5/2009 | Prahlad et al. |
| 7,650,533 B1 | 1/2010 | Saxena et al. |
| 7,716,438 B2 | 5/2010 | Ushijima et al. |
| 7,809,691 B1 | 10/2010 | Karmarkar et al. |
| 7,822,717 B2 | 10/2010 | Kapoor et al. |
| 7,836,267 B1 | 11/2010 | Cross |
| 7,934,064 B1 | 4/2011 | Per et al. |
| 7,958,326 B2 | 6/2011 | Amano et al. |
| 8,060,713 B1 | 11/2011 | Natanzon |
| 8,095,804 B1 | 1/2012 | Armangau et al. |
| 8,099,572 B1 | 1/2012 | Arora et al. |
| 8,166,128 B1* | 4/2012 | Faulkner ............ G06F 11/0727 707/999.004 |
| 8,250,033 B1 | 8/2012 | De Souter et al. |
| 8,260,752 B1 | 9/2012 | Stringham et al. |
| 8,352,422 B2 | 1/2013 | Prahlad et al. |
| 8,375,158 B2 | 2/2013 | Cho |
| 8,380,939 B2 | 2/2013 | Agesen |
| 8,386,733 B1 | 2/2013 | Tsaur et al. |
| 8,417,872 B2 | 4/2013 | Bae et al. |
| 8,453,145 B1 | 5/2013 | Naik |
| 8,473,697 B1 | 6/2013 | Tiwari et al. |
| 8,495,316 B2 | 7/2013 | Nagarkar et al. |
| 8,555,009 B1 | 10/2013 | Majahan et al. |
| 8,566,510 B2 | 10/2013 | Weingarten |
| 8,666,944 B2 | 3/2014 | Beatty et al. |
| 8,738,874 B2 | 5/2014 | Nemoto et al. |
| 8,738,883 B2 | 5/2014 | Wade et al. |
| 8,788,769 B2* | 7/2014 | Abercrombie ....... G06F 11/1461 711/161 |
| 8,818,936 B1 | 8/2014 | Haase et al. |
| 8,819,362 B1 | 8/2014 | Duprey et al. |
| 8,904,125 B1 | 12/2014 | Elling et al. |
| 9,218,138 B1* | 12/2015 | Haase .................. G06F 16/128 |
| 10,176,048 B2 | 1/2019 | Jaquette et al. |
| 10,241,691 B2 | 3/2019 | Jain et al. |
| 10,372,546 B2 | 8/2019 | Jaquette et al. |
| 2003/0167380 A1 | 9/2003 | Green et al. |
| 2004/0117572 A1 | 6/2004 | Welsh et al. |
| 2004/0158766 A1 | 8/2004 | Liccione et al. |
| 2004/0186968 A1 | 9/2004 | Factor et al. |
| 2004/0260726 A1 | 12/2004 | Hrle et al. |
| 2004/0260895 A1* | 12/2004 | Werner ............... G06F 11/2082 711/162 |
| 2005/0108302 A1 | 5/2005 | Rand et al. |
| 2005/0210320 A1 | 9/2005 | Vincent |
| 2005/0216788 A1 | 9/2005 | Mani-Meitav et al. |
| 2006/0041727 A1* | 2/2006 | Adkins ................ G06F 11/1451 711/162 |
| 2006/0173935 A1* | 8/2006 | Merchant ........... G06F 11/1451 707/999.204 |
| 2006/0224636 A1 | 10/2006 | Kathuria et al. |
| 2007/0022319 A1 | 1/2007 | Haselton et al. |
| 2007/0055833 A1 | 3/2007 | Vu et al. |
| 2007/0245104 A1* | 10/2007 | Lindemann ......... G06F 11/1469 711/162 |
| 2007/0276885 A1 | 11/2007 | Valiyaparambil et al. |
| 2007/0277010 A1 | 11/2007 | Anand et al. |
| 2007/0277012 A1 | 11/2007 | Hara et al. |
| 2007/0294495 A1* | 12/2007 | Uchida ............... G06F 11/1451 711/162 |
| 2007/0294568 A1* | 12/2007 | Kanda ................ G06F 11/1451 714/6.12 |
| 2008/0077629 A1* | 3/2008 | Lorenz ............... G06F 3/0608 707/999.203 |
| 2008/0098195 A1 | 4/2008 | Cheon et al. |
| 2008/0154914 A1* | 6/2008 | Kan ................... G06F 11/1458 707/999.01 |
| 2008/0162590 A1 | 7/2008 | Kundu et al. |
| 2008/0243954 A1 | 10/2008 | Augenstein et al. |
| 2008/0313414 A1 | 12/2008 | Shackelford |
| 2009/0150641 A1 | 6/2009 | Flynn et al. |
| 2009/0193064 A1* | 7/2009 | Chen ................. G06F 17/30315 707/999.204 |
| 2009/0150626 A1 | 11/2009 | Benhase et al. |
| 2009/0307286 A1 | 12/2009 | Laffin |
| 2010/0042791 A1* | 2/2010 | Helman ............... G06F 16/215 711/162 |
| 2010/0049929 A1 | 2/2010 | Nagarkar et al. |
| 2010/0057789 A1* | 3/2010 | Kawaguchi ......... G06F 11/1456 707/E17.005 |
| 2011/0055500 A1* | 3/2011 | Sasson ............... G06F 11/1451 711/162 |
| 2011/0093436 A1 | 4/2011 | Zha et al. |
| 2011/0107025 A1 | 5/2011 | Urkude et al. |
| 2011/0173404 A1 | 7/2011 | Eastman et al. |
| 2011/0191295 A1 | 8/2011 | Ozdemir et al. |
| 2012/0078855 A1* | 3/2012 | Beatty ................ G06F 11/1451 707/676 |
| 2012/0130956 A1 | 5/2012 | Caputo |
| 2012/0136832 A1* | 5/2012 | Sadhwani ........... G06F 11/1469 707/640 |
| 2012/0158662 A1 | 6/2012 | Buragohain et al. |
| 2012/0179655 A1 | 7/2012 | Beatty et al. |
| 2012/0197842 A1 | 8/2012 | Marie et al. |
| 2012/0203742 A1 | 8/2012 | Goodman et al. |
| 2012/0278539 A1 | 11/2012 | Hosogaya |
| 2012/0284232 A1 | 11/2012 | Fiske |
| 2012/0290802 A1 | 11/2012 | Wade et al. |
| 2013/0006944 A1 | 1/2013 | Prahlad et al. |
| 2013/0042054 A1 | 2/2013 | Jung et al. |
| 2013/0046734 A1 | 2/2013 | Cisler et al. |
| 2013/0103649 A9 | 4/2013 | Linde |
| 2013/0132346 A1 | 5/2013 | Varadarajan |
| 2013/0173552 A1 | 7/2013 | Marie et al. |
| 2013/0318318 A1 | 11/2013 | Nemoto et al. |
| 2013/0326125 A1 | 12/2013 | Chang et al. |
| 2014/0052693 A1* | 2/2014 | Zha ................... G06F 17/30592 707/639 |
| 2014/0095823 A1 | 4/2014 | Shaikh et al. |
| 2014/0122434 A1* | 5/2014 | Knight ............... G06F 11/1453 707/645 |
| 2014/0149695 A1 | 5/2014 | Zaslavsky et al. |
| 2014/0164330 A1 | 6/2014 | Barnes et al. |
| 2014/0164660 A1 | 6/2014 | DeCesaris et al. |
| 2014/0258241 A1* | 9/2014 | Chen ................. G06F 17/30371 707/683 |
| 2014/0258613 A1 | 9/2014 | Sampathkumar |
| 2015/0227432 A1 | 8/2015 | Jaquette et al. |
| 2015/0227433 A1 | 8/2015 | Jaquette et al. |
| 2015/0227575 A1 | 8/2015 | Jaquette et al. |
| 2015/0310080 A1 | 10/2015 | Jaquette et al. |
| 2019/0179708 A1 | 6/2019 | Jaquette et al. |
| 2019/0310995 A1 | 10/2019 | Jaquette et al. |

FOREIGN PATENT DOCUMENTS

| | | |
|---|---|---|
| CN | 101149694 A | 3/2008 |
| CN | 102236589 | 4/2013 |
| CN | 103262043 | 8/2013 |
| EP | 2234018 | 3/2012 |
| JP | 201126939 A | 2/2005 |
| JP | 2005038176 A | 2/2005 |
| JP | 2005292865 A | 10/2005 |
| JP | 2007317186 A | 12/2007 |
| JP | 2008250667 A | 10/2008 |
| JP | 2012014286 A | 1/2012 |
| JP | 2012146301 A | 8/2012 |
| WO | 9308529 A1 | 4/1993 |

(56) References Cited

FOREIGN PATENT DOCUMENTS

| | | |
|---|---|---|
| WO | 2001001257 | 6/2001 |
| WO | 2010065271 | 8/2010 |
| WO | 2013175422 | 11/2013 |

OTHER PUBLICATIONS

Office Action dated Feb. 9, 2016, pp. 49, for U.S. Appl. No. 14/175,987, filed Feb. 7, 2014.
PCT International Search Report and Written Opinion dated Jun. 15, 2015, for Application No. PCT/IB2015/050225, filed Jan. 12, 2015.
U.S. Pat. No. 8,666,944 is the English language counterpart of Chinese Patent No. 103262043.
U.S. Appl. No. 14/263,917, filed Apr. 28, 2014.
English language translation of CN 1740981 filed Mar. 1, 2006.
English language translation of CN 102236589 filed Apr. 17, 2013.
English language translation of CN 103262043 filed Aug. 21, 2013.
Chesarek, et al., "IBM System Storage FlashCopy Manager and PPRC Manager Overview", IBM Corporation, Document No. REDP-4065, pp. 62, 2008.
Burger, et al., IBM System Storage DS8000 Series: IBM FlashCopy SE, IBM Corporation, Document No. REDP-4368-00, pp. 80, Feb. 2008.
Cronauer, et al., "IBM System Storage D58000 Copy Services for Open Systems", IBM Corporation, Document No. SG24-6788-06, pp. 800, Feb. 2013.
Using a Repository Having a Full Copy of Source Data and Point-in-Time Information From Point-in-Time Copies of the Source Data to Restore the Source Data At Different Points-in Time, by G.A. Jaquette et al., US Application Serial No. Unknown, filed Feb. 7, 2014.
Creating a Restore Copy From a Copy of Source Data in a Repository Having Source Data At Different Point-in-Times and Reading Data From the Repository for the Restore Copy, by Jaquette et al.,US Application Serial No. Unknown, filed Feb. 7, 2014.
Creating a Restore Copy From a Copy of Source Data in a Repository Having Source Data At Different Point-in-Times, by G.A. Jaquette et al.,US Application Serial No. Unknown, filed Feb. 7, 2014.
PCT International Search Report and Written Opinion dated Sep. 6, 2015 for Application No. PCT/IB2015/052543 filed Apr. 8, 2015, pp. 10.
Final Office Action dated Jul. 20, 2016, pp. 40, for U.S. Appl. No. 14/175,987, filed Feb. 7, 2014.
Final Office Action dated Jul. 15, 2016, pp. 40, for U.S. Appl. No. 14/175,964, filed Feb. 7, 2014.
Response dated May 9, 2016, pp. 16, to Office Action dated Feb. 9, 2016, pp. 49, for U.S. Appl. No. 14/175,987, filed Feb. 7, 2014.
Office Action dated May 20, 2016, pp. 52, for U.S. Appl. No. 14/263,917, filed Apr. 28, 2014.
Response dated Mar. 30, 2016, pp. 15, to Office Action dated Dec. 30, 2015, pp. 36, for U.S. Appl. No. 14/175,964, filed Feb. 7, 2014.
Amendment dated May 10, 2017, pp. 15, to Final Office Action dated Feb. 10, 2017, pp. 29, for U.S. Appl. No. 14/175,980, filed Feb. 7, 2014.
Notice of Allowance dated Jul. 13, 2017, pp. 15, for U.S. Appl. No. 14/175,987, filed Feb. 7, 2014.
Amendment dated Nov. 15, 2016, pp. 14, to Final Office Action dated Jul. 15, 2016, pp. 40, for U.S. Appl. No. 14/175,964, filed Feb. 7, 2014.
UK Reply to Examination Report dated Feb. 1, 2017, pp. 4, to UK Examination Report dated Dec. 16, 2016, pp. 3, for Application No. 1619298.1, filed Apr. 8, 2015.
Final Office Action dated Feb. 10, 2017, pp. 29, for U.S. Appl. No. 14/175,980, filed Feb. 7, 2014.
Preliminary Amendment dated Jan. 24, 2017, pp. 12, for U.S. Appl. No. 14/263,917, filed Apr. 28, 2014.
Office Action dated Jul. 21, 2016, pp. 52, for U.S. Appl. No. 14/175,980, filed Feb. 7, 2014.
Response dated Aug. 22, 2016, pp. 17, to Office Action dated May 20, 2016, pp. 52, for U.S. Appl. No. 14/263,917, filed Apr. 28, 2014.
Response dated Oct. 21, 2016, pp. 14, for U.S. Appl. No. 14/175,980, filed Feb. 7, 2014.
Response dated Oct. 20, 2016, pp. 17, to Final Office Action dated Jul. 20, 2016, pp. 40, for U.S. Appl. No. 14/175,987, filed Feb. 7, 2014.
Final Office Action dated Sep. 22, 2016, pp. 33, for U.S. Appl. No. 14/263,917, filed Apr. 28, 2014.
Response dated Dec. 20, 2016, pp. 15, to Office Action dated May 20, 2016, pp. 52, for U.S. Appl. No. 14/263,917, filed Apr. 28, 2014.
Response dated Oct. 17, 2016, pp. 14, to Final Office Action dated Jul. 15, 2016, pp. 40, for U.S. Appl. No. 14/175,964, filed Feb. 7, 2014.
UK Examination Report dated Dec. 16, 2016, pp. 3, for Application No. 1619298.1, filed Apr. 8, 2015.
Advisory Action dated Jan. 23, 2017, pp. 8, for U.S. Appl. No. 14/263,917, filed Apr. 28, 2014.
Notice of Allowance dated Jan. 26, 2017, pp. 21, for U.S. Appl. No. 14/175,987, filed Feb. 7, 2014.
Office Action dated Sep. 14, 2017, pp. 48, for U.S. Appl. No. 14/175,964, filed Feb. 7, 2014.
Notice of Allowance dated Sep. 12, 2017, pp. 21, for U.S. Appl. No. 14/175,980, filed Feb. 7, 2014.
Office Action dated Sep. 14, 2017, pp. 41, for U.S. Appl. No. 14/263,917, filed Apr. 28, 2014.
Notice of Allowance dated Nov. 7, 2017, pp. 24, for U.S. Appl. No. 14/175,987, filed Feb. 7, 2014.
Response dated Dec. 14, 2017, pp. 17, to Office Action dated Sep. 14, 2017, pp. 41, for U.S. Appl. No. 14/263,917, filed Apr. 28, 2014.
Response dated Dec. 14, 2017, pp. 15, to Office Action dated Sep. 14, 2017, pp. 48, for U.S. Appl. No. 14/175,964, filed Feb. 7, 2014.
Final Office Action dated Feb. 20, 2018, pp. 32, for U.S. Appl. No. 14/263,917, filed Apr. 28, 2014.
U.S. Pat. No. 7,272,693 dated Sep. 18, 2007 is the English counterpart of JP2005292865 dated Oct. 20, 2005.
US20070277012 dated Nov. 29, 2007 is the English counterpart of JP2007317186 dated Dec. 6, 2007.
U.S. Pat. No. 7,958,326 dated Jun. 7, 2011 is the English counterpart of JP2008250667 dated Oct. 16, 2008.
US20120179655 dated Jul. 12, 2012 is the English counterpart of JP2012146301 dated Aug. 2, 2012.
CN Office Action dated Jul. 3, 2018, p. 6, for Application No. 201580007367.
English Machine translation of CN Office Action dated Jul. 3, 2018, pp. 7, for Application No. 201580007367.
English Machine translation of CN1071770A dated May 5, 1993, pp. 11.
English Machine translation of CN 101149694 dated Mar. 26, 2008, pp. 8.
WO9308529A1 dated Apr. 29, 1993 is the English counterpart of CN101149694A dated Mar. 26, 2008, pp. 34.
Robocopy.exe, Microsoft, Corpporation, Copyright 1985-2003, pp. 35.
English Machine translation of JP2005292865, dated Sep. 21, 2018, pp. 16.
English Machine translation of JP2007317186, dated Sep. 21, 2018, pp. 33.
English Machine translation of JP2008250667, dated Sep. 21, 2018, pp. 40.
English Machine translation of JP2012146301, dated Sep. 21, 2018, pp. 18.
Pre-Appeal Brief Request dated Jul. 30, 2018, pp. 6, for U.S. Appl. No. 14/175,964.
Office Action dated Jan. 10, 2019, pp. 15, for U.S. Appl. No. 14/175,964.
Notice of Allowance dated Dec. 13, 2018, pp. 22, for U.S. Appl. No. 14/175,980.
Notice of Allowance dated Apr. 9, 2018, pp. 28, for U.S. Appl. No. 14/175,987.

(56) References Cited

OTHER PUBLICATIONS

Pre-Appeal Brief Request dated May 21, 2018 for U.S. Appl. No. 14/263,917.
Office Action dated Aug. 10, 2018, pp. 15, for U.S. Appl. No. 14/263,917.
Response dated Nov. 13, 2018, pp. 15, to Office Action dated Aug. 10, 2018, pp. 15, for U.S. Appl. No. 14/263,917.
Final Office Action 2 dated Apr. 30, 2018, pp. 33, for U.S. Appl. No. 14/175,964, filed Feb. 7, 2014.
JP Office Action dated Jan. 8, 2019, pp. 4, for Serial No. 2016-562001.
English machine translation of JP Office Action dated Jan. 8, 2019, p. 3, for Serial No. 2016-562001.
English machine translation of JP2005038176A dated Feb. 10, 2005, pp. 13.
English machine translation of JP201126939 dated Feb. 4, 2010, pp. 23.
U.S. Pat. No. 8,738,874 dated May 27, 2014 is the English language equivalent of JP201126939 dated Feb. 4, 2010.
Notice of Allowance dated Mar. 15, 2019, pp. 22+2, for U.S. Appl. No. 14/175,980.
U.S. Appl. No. 16/277,998, filed Feb. 15, 2019.
List of IBM Patents and Applications Treated as Related, dated Apr. 5, 2019, pp. 2.
Final Office Action dated Feb. 5, 2019, pp. 3, Application No. JP2016-548352.
English machine translation dated Feb. 11, 2019, pp. 4, of Final Office Action dated Feb. 5, 2019, pp. 3, Application No. JP2016-548352 filed Jan. 12, 2015.
English machine translation dated Feb. 11, 2019, pp. 25 of JP2012014286 dated Jan. 19, 2012.
Notice of Allowance dated Jan. 30, 2019, pp. 42, for U.S. Appl. No. 14/263,917.
Response dated Apr. 10, 2019, pp. 16, to Office Action dated Jan. 10, 2019, pp. 15, for U.S. Appl. No. 14/175,964.
Notice of Allowance2 dated Jan. 9, 2018, pp. 12, for U.S. Appl. No. 14/175,980, filed Feb. 7, 2014.
Notice of Allowance dated Mar. 16, 2018, pp. 16, for U.S. Appl. No. 14/175,980, filed Feb. 7, 2014.
Notice of Allowance dated Sep. 7, 2018, pp. 21, for U.S. Appl. No. 14/175,987, filed Feb. 7, 2014.
Notice of Allowance dated Apr. 8, 2019, pp. 27, for U.S. Appl. No. 14/263,917.
Final Office Action dated Aug. 28, 2019, pp. 44, for U.S. Appl. No. 14/175,964.
U.S. Appl. No. 16/449,271, filed Jun. 21, 2019.
Preliminary Amendment filed Jun. 21, 2019, pp. 8, for U.S. Appl. No. 16/449,271.
Notice of Allowance dated Oct. 5, 2020, pp. 27, for U.S. Appl. No. 14/175,964.
Preliminary Amendment dated Feb. 15, 2019, pp. 8, for U.S. Appl. No. 16/277,998.
Office Action dated Oct. 6, 2020, pp. 53, for U.S. Appl. No. 16/277,998.
List of IBM Patents and Applications Treated as Related, dated Oct. 7, 2020, pp. 2.
Notice of Allowance dated Jul. 13, 2020, pp. 22, for U.S. Appl. No. 14/175,964.
Notice of Allowance6 dated May 22, 2019, pp. 32, for U.S. Appl. No. 14/175,980.
Feb. 7, 2014, U.S. Appl. No. 14/175,964, 2015/0227575.
Feb. 7, 2014, U.S. Appl. No. 14/175,980, 20150227432.
Feb. 15, 2019, U.S. Appl. No. 16/277,998.
Feb. 7, 2014, U.S. Appl. No. 14/175,987, U.S. Pat. No. 10,176,048.
Apr. 28, 2014, U.S. Appl. No. 14/263,917, 2015/0310080.
Notice of Allowance dated Dec. 17, 2020, pp. 32, for U.S. Appl. No. 14/175,964.
Response dated Jan. 14, 2021, pp. 20, to Office Action dated Oct. 6, 2020, p. 53, for U.S. Appl. No. 16/277,998.
Notice of Allowance dated Mar. 26, 2021, pp. 20, for U.S. Appl. No. 16/277,998.
Office Action dated Jun. 11, 2021, pp. 67, for U.S. Appl. No. 16/449,271.
Pre-Appeal Brief dated Dec. 29, 2019, pp. 6, for U.S. Appl. No. 14/175,964.
Appeal Brief dated Mar. 20, 2020, pp. 26, for U.S. Appl. No. 14/175,964.

\* cited by examiner

Point-in-Time Copy Information

Full Copy Information

Restore Copy Metadata

CREATING A RESTORE COPY FROM A COPY OF A FULL COPY OF SOURCE DATA IN A REPOSITORY THAT IS AT A DIFFERENT POINT-IN-TIME THAN A RESTORE POINT-IN-TIME OF A RESTORE REQUEST

BACKGROUND OF THE INVENTION

1. Field of the Invention

The present invention relates to a computer program product, system, and method for creating a restore copy from a copy of a full copy of source data in a repository that is at a different point-in-time than a restore point-in-time of a restore request.

2. Description of the Related Art

In a storage environment, a storage controller may create point-in-time ("PiT") copies of a production volume using point-in-time copy techniques, such as the IBM Flash-Copy® (FlashCopy is a registered trademark of IBM), snapshot, etc. A point-in-time copy replicates data in a manner that appears instantaneous and allows a host to continue accessing the source volume while actual data transfers to the copy volume are deferred to a later time. The point-in-time copy appears instantaneous because complete is returned to the copy operation in response to generating the relationship data structures without copying the data from the source to the target volumes. Point-in-time copy techniques typically defer the transfer of the data in the source volume at the time the point-in-time copy relationship was established to the copy target volume until a write operation is requested to that data block on the source volume. Data transfers may also proceed as a background copy process with minimal impact on system performance. The point-in-time copy relationships that are immediately established in response to the point-in-time copy command include a bitmap or other data structure indicating the location of blocks in the volume at either the source volume or the copy volume. The point-in-time copy comprises the combination of the data in the source volume and the data to be overwritten by the updates transferred to the target volume.

When an update to a block in the source volume involved in a point-in-time copy relationship is received, the copy of the track as of the point-in-time must be copied to side file or the target volume before the new data for the track is written to the source volume, overwriting the point-in-time copy of the data.

SUMMARY

Provided are a computer program product, system, and method for creating a restore copy from a copy of a full copy of source data in a repository that is at a different point-in-time than a restore point-in-time of a restore request. A repository has a full copy of source data as of a full copy point-in-time and for each of a plurality of point-in-time copies at different point-in-times of the source data, change information indicating changed data in the source data that changed between the point-in-time of the point-in-time copy and a subsequent point-in-time, and changed point-in-time data comprising data in the source data as of the point-in-time of the point-in-time copy indicated in the change information as changed. A restore request is received to restore the source data as of a restore point-in-time different from the point-in-time of the full copy. A point-in-time copy of the full copy is created. The created point-in-time copy of the full copy is returned as a restore copy to the restore request, wherein the restore copy has data as of a restore copy point-in-time comprising the point-in-time copy of the full copy which is different from the restore point-in-time.

DETAILED DESCRIPTION

Described embodiments provide techniques for creating a repository to maintain a full copy of the source data and point-in-time copies of the source data to allow the source data to be restored from the repository at different point-in-times. Further, with described embodiments, the operations to maintain the point-in-time ("PiT") copy information in the repository and perform the restore operations may be performed by a program component separate from the storage controller logic creating the point-in-time copies from the source data, so that the repository is separately maintained, used, and managed from the storage controller. Yet further, with described embodiments, a restore copy may be created from a full copy of the source data in the repository that is at a different point-in-time than a restore point-in-time of the restore request, such that data may be returned from the PiT copies to provide data as of the restore point-in-time.

Figure 1:
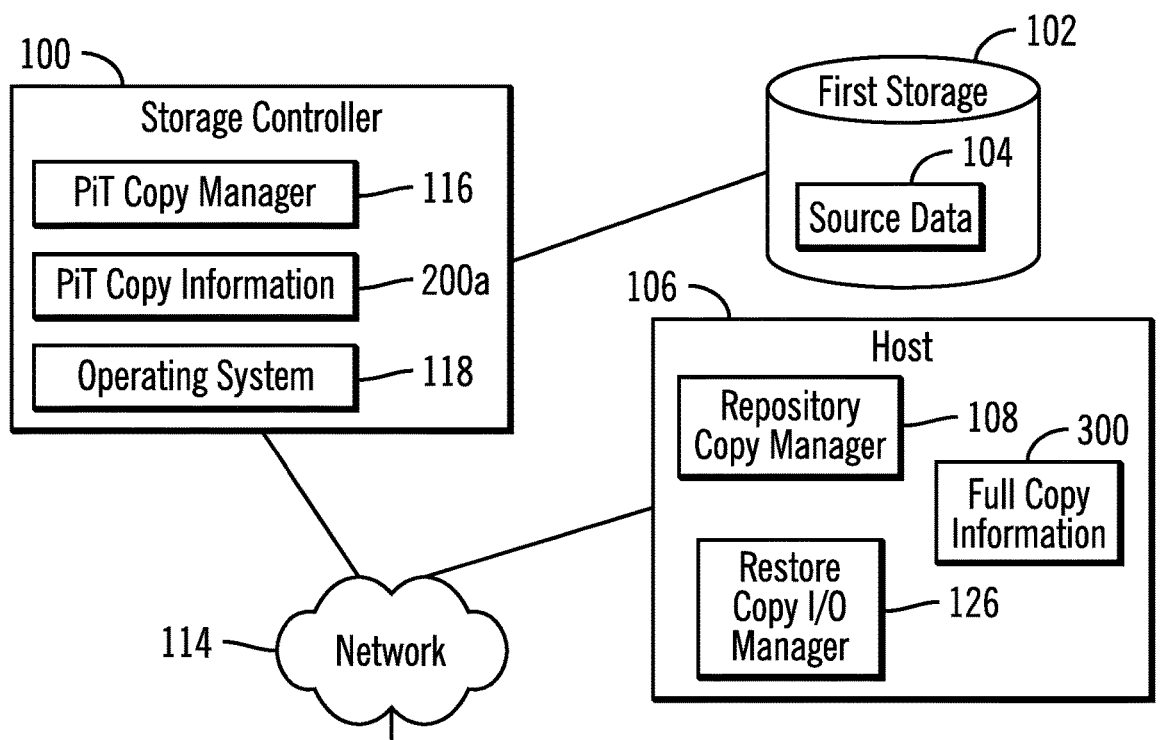
FIG. 1 illustrates an embodiment of a storage environment.

FIG. 1 illustrates an embodiment of a data storage environment having a storage controller 100 managing access to a first storage 102 that includes source data 104, such as a production volume used by different host systems. A host 106 includes a repository copy manager program 108 to manage the copying of the source data 104 to a repository 110 in a second storage 112. The storage controller 100, host 106, and second storage 112 may communicate over a network 114.

The storage controller 100 includes a point-in-time ("PiT") copy manager 116 to create point-in-time copies of the source data 104, e.g., FlashCopy, snapshot, etc. When creating a PiT copy, the PiT copy manager 116 generates PiT copy information 200a on the PiT copy created as of a point-in-time. The storage controller 100 further includes an operating system 118, including the code and logic to manage Input/Output ("I/O") requests to the source data 104. The operating system 118 may configure the source data 104 in one or more volumes and data is stored in data units, such as tracks, logical block addresses (LBAs), extents, etc. The PiT copy manager 116 may be a copy service supplied with the operating system 118.

The storages 102 and 112 may store tracks in a Redundant Array of Independent Disks (RAID) configuration where strides of tracks are written across multiple storage devices comprising the storages 102 and 112. The storages 102 and 112 may each comprise one or more storage devices known in the art, such as interconnected storage devices, where the storage devices may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc.

The network 114 may comprise a network such as one or more interconnected Local Area Networks (LAN), Storage Area Networks (SAN), Wide Area Network (WAN), peer-to-peer network, wireless network, etc.

The PiT copy manager 116 performs a PiT copy operation that replicates data in a manner that appears instantaneous and allows a process to continue accessing the source volume while actual data transfers to the copy volume are deferred to a later time. The point-in-time copy appears instantaneous because complete is returned to the copy operation in response to generating the relationship data structures without copying the data.

The repository copy manager 108 may create a full copy 120 of the source data 104 in the repository 110 and copies the PiT copy information 200a at the storage controller 100 to the repository 110 to store as repository PiT copy information 200b in the repository 110. The repository copy manager 108 maintains full copy information 300 that is used to manage the creation of the full copy 120. In this way, the repository copy manager 108 maintains a separate full copy of the source data 104 and the PiT copy information 200b of the source data 104 in a separate storage 112 so that data can be restored to different point-in-times independently of the source data 104 in the first storage 102 and the PiT copy information 200a at the storage controller 100. Thus, the repository 110 by allowing for independent restore of the source data 104 provides a redundant secure backup independent of the storage controller 100 to protect from failure at the storage controller 100 or first storage 102.

In certain embodiments, the creation and management of the repository 110 is managed by a repository copy manager 108 that is separate from the storage controller 100 programs, such as the PiT copy manager 116 that creates the PiT copies.

The host 106 may further include a restore copy I/O manager 122 to manage I/O requests directed to restore copies 124 to ensure that data as of a restore time for which the restore copy 124 is create is returned from the restore copy 124 or the repository PiT copy information 200b.

In the embodiment of FIG. 1, the repository creation and restore operations and the restore copy I/O management operations may be performed by program components, such as the repository copy manager 108 and the restore copy I/O manager 126, that are separate from the storage controller logic, e.g., the PiT copy manager 116 that created the PiT copies. In an alternative embodiment, the repository copy manager 108, restore copy I/O manager 126, and the full copy information 300, and/or the repository 110 may be maintained on the storage controller 100.

Figure 2:
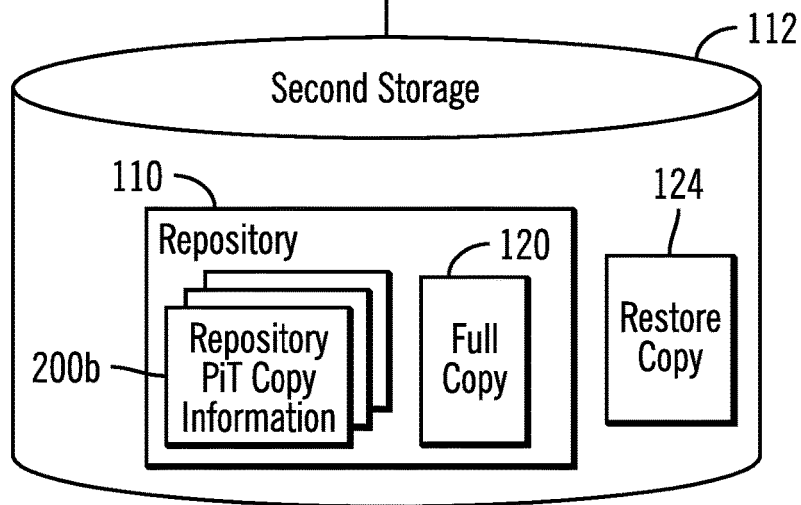
FIG. 2 illustrates an embodiment of point-in-time copy information.

FIG. 2 illustrates an instance of the PiT copy information 200, which may comprise information maintained for the storage controller PiT copy information 200a and the repository PiT copy information 200b. The PiT copy information 200, for the storage controller 200a and repository 200b may be stored in different formats reflecting the different use of that information because the repository PiT copy information 200b is intended for use by the repository copy manager 108 to manage the source data in the repository. A PiT copy information instance 200, may include a PiT copy identifier 202 identifying the PiT copy created by the PiT copy manager 116 at the storage controller 100; a point-in-time 204 of the PiT copy 202, which may mean that data is consistent as of that point-in-time 204; change information 206 indicating which data or tracks in the source data 104 has changed since the point-in-time 204 and while the PiT copy 202 was open, which may comprise a bitmap having a bit for each data unit (e.g., track) that is set to one of two values indicating the data or track represented by the bit has or has not been updated since the point-in-time 204; and the changed PiT data 208 comprising the data at the point-in-time 204 that was changed after the point-in-time 204 while the PiT copy 202 was open and still being updated.

In one embodiment, the PiT copy may be completed or frozen at a time subsequent to the point-in-time 204, such that the changed PiT data 208 includes data changed from the point-in-time 204 until the PiT copy 202 was completed, e.g., frozen or a new PiT copy initiated, and does not include changed data after the PiT copy 202 was completed, e.g., frozen. A PiT copy 202 may be completed upon a freeze command or initiating a subsequent PiT copy at a subsequent point-in-time to the point-in-time 204. A completed PiT copy 202 may be consistent as of the point-in-time. Other techniques may be used to complete, e.g., freeze, the PiT copy.

In one embodiment, the full copy 120 may be a separate copy of the source data as shown in FIG. 1. In an alternative embodiment, the data in the full copy 120 may be included in the changed PiT data 208.

Figure 3:
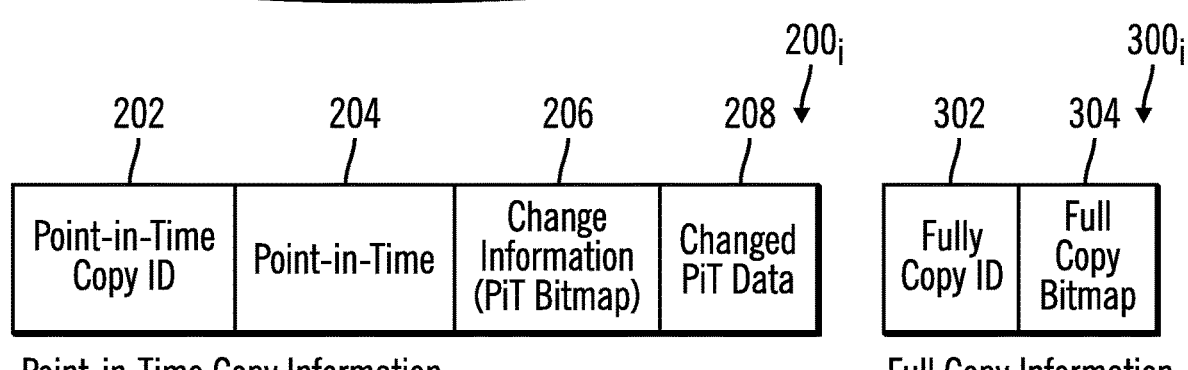
FIG. 3 illustrates an embodiment of full copy information.

FIG. 3 illustrates an embodiment of full copy information 300, maintained by the repository copy manager 108, comprising an instance of the full copy information 300 for one full copy 120 being created in the repository 110. The full copy information instance 300, may include a full copy identifier 302 of the particular full copy 120 and a full copy bitmap 304 having a bit for each track or data unit in the source data 104 to copy to the full copy 120, where each bit indicates whether the corresponding data unit has or has not been copied. The background copy operation of the source data 104 to the full copy 120 is completed after all the bits in the full copy bitmap 304 are set to indicate the source data was copied.

Figure 4:
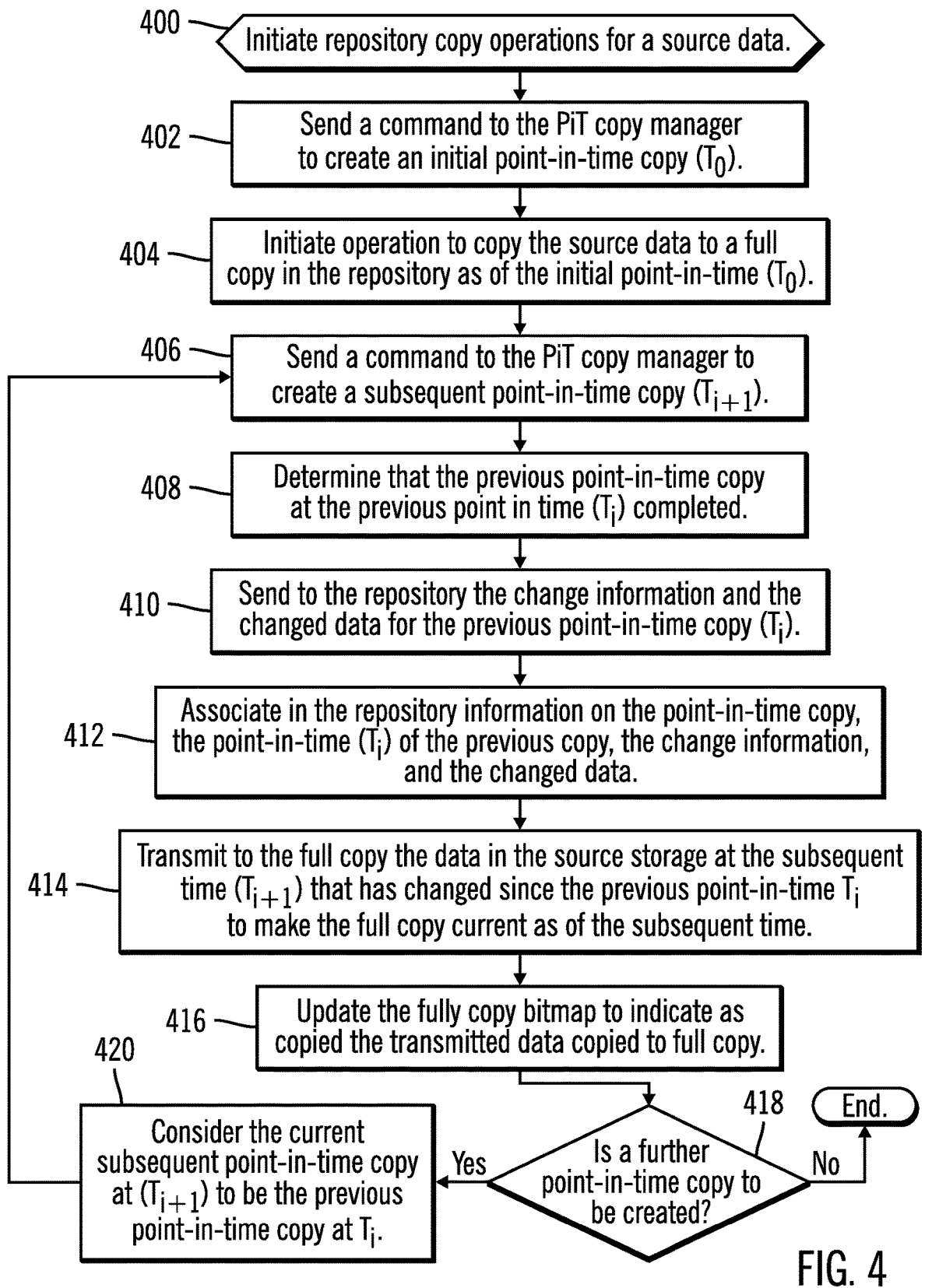
FIGS. 4 and 6 illustrate embodiments of operations to create a repository having the source data and point-in-time information of the source data at different point-in-times.

FIG. 4 illustrates an embodiment of operations performed by the repository copy manager 108 and the PiT copy manager 116 to create a repository 110 copy at different points-in-times from the PiT copies for source data 104, such as a production volume, created by the PiT copy manager 116. Upon initiating (at block 400) repository copy operations for source data 104, the repository copy manager 108 sends (at block 402) a command to the PiT copy manager 116 to create an initial point-in-time copy $200_0$ at an initial point-in-time, referred to herein as $T_0$. The repository copy manager 108 initiates (at block 404) an operation to copy the source data 104 to a full copy 120 in the repository 110 as of the initial point-in-time ($T_0$). A part of the operation to create the full copy 120, the repository copy manager 108 may initialize full copy information instance $300_i$, for the full copy 120 being created, and may initialize all the bits in the full copy bitmap 304 to indicate the corresponding data units in the source data 104 have not been copied. The source data 104 may be copied in the background to the full copy 120 and the full copy bitmap 304 updated for data units from the source data 104 copied to the full copy 102.

The repository copy manager 108 may send (at block 406) a command to the PiT copy manager 116 to create a subsequent PiT copy ($T_{i+1}$) at a subsequent point-in-time $T_{i+1}$, which would result in PiT copy information $200_{i+1}$. In one embodiment, the repository copy manager 108 may send individual commands to the PiT copy manager 116 to create PiT copies and freeze a previously created PiT copy. In an alternative embodiment, the repository copy manager 108 may send one command to the PiT copy manager 116 to instruct it to periodically create PiT copies of the source data 104, where the creation of a subsequent PiT copy freezes the previously created PiT copy. Still further, the PiT copy manager 116 at the storage controller 100 may be independently creating PiT copies without prompting from the repository copy manager 108.

Upon determining (at block 408) that the previous point-in-time copy at $T_i$ completed, the repository copy manager 116 sends (at block 410) to the repository 110 for storage the PiT copy information for the PiT copy at time $T_i$, including the change information 206 and the changed PiT data 208 to store in the repository PiT copy information for $T_i$. In one embodiment, a PiT copy at point-in-time $T_i$ may be completed upon the creation of the subsequent PiT copy at time $T_{i+1}$. In an alternative embodiment, a PiT copy may be completed by issuing a freeze command to freeze the PiT copy so that the change information 206 stops indicating changes to the source data 104. The repository 110 creates (at bock 412) in the repository PiT copy information 200b an association of the point-in-time 204 of the previous PiT copy, the change information 206 and the changed PiT data 208 for the previous PiT copy.

The repository copy manager 108 may transmit (at block 414) to the full copy 120 the data in the source data 104 at the subsequent time ($T_{i+1}$) to make the full copy current as of the subsequent time $T_{i+1}$. To perform this operation, the repository copy manager 108 may determine from the change information 206 for the previous PiT copy at $T_i$ the data units in the source data 104 that have changed and then copy those data units from the source data 104 to the full copy 120. In this way, at the subsequent point-in-time $T_{i+1}$ when the subsequent PiT copy ($T_{i+1}$) is created, data units in the source data 104 that have changed between the previous point-in-time $T_i$ and the subsequent point-in-time $T_{i+1}$ are copied to the full copy 120 in the repository 110. The full copy bitmap 304 is updated (at block 416) to indicate any data units from the source data 104 copied to the full copy 120 after the data units are transmitted at block 414. In this way, the full copy 120 is always moving forward in time, having data current as of the most recent or subsequent PiT copy. At some point, the full copy 120 may be completed while PiT copies are still being created. In such case, the full copy 120 will continue to be updated with changed data units determined at subsequent point-in-times for subsequent PiTs.

If (at block 418) further point-in-time copies are to be created, then the repository copy manager 108 considers (at block 420) the current subsequent point-in-time copy at ($T_{i+1}$) to be the previous point-in-time copy at $T_i$ during the next iteration of processing the next PiT copy. In this way, i is effectively incremented as the current subsequent point-in-time $T_{i+1}$ becomes the previous point-in-time and a next point-in-time becomes the new subsequent point-in-time. Control then proceeds back to block 406 to create or process a new subsequent PiT copy ($T_{i+1}$) at a new subsequent point-in-time $T_{i+1}$. If (at block 418) there are no further PiT copies to process, then control ends.

With the described embodiments of FIG. 4, a repository 110 of a full copy of the source data 104 having PiT copy information for different PiT copies is created independently of the storage controller operations to create the PiT copies. In this way, the logic or operations of the repository management operations are independent of the storage controller 100 logic to create PiT copies.

Figure 5A:
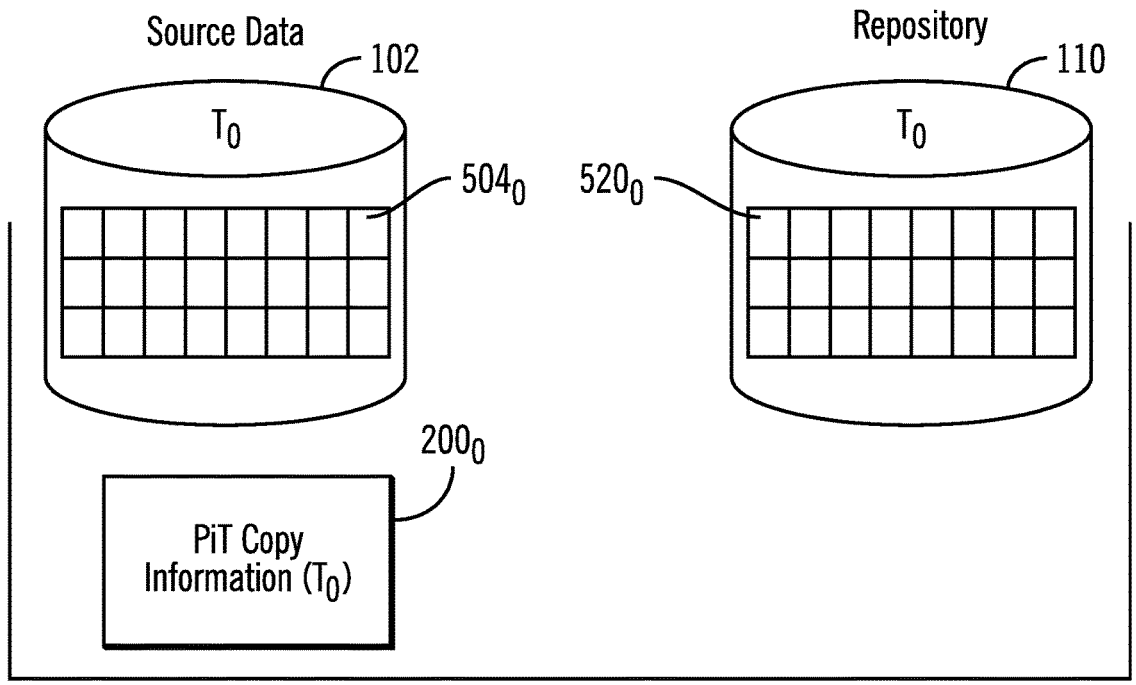
FIGS. 5a, 5b, and 5c illustrate examples of states of the source data and the repository at different point-in-times.
Figure 5B:
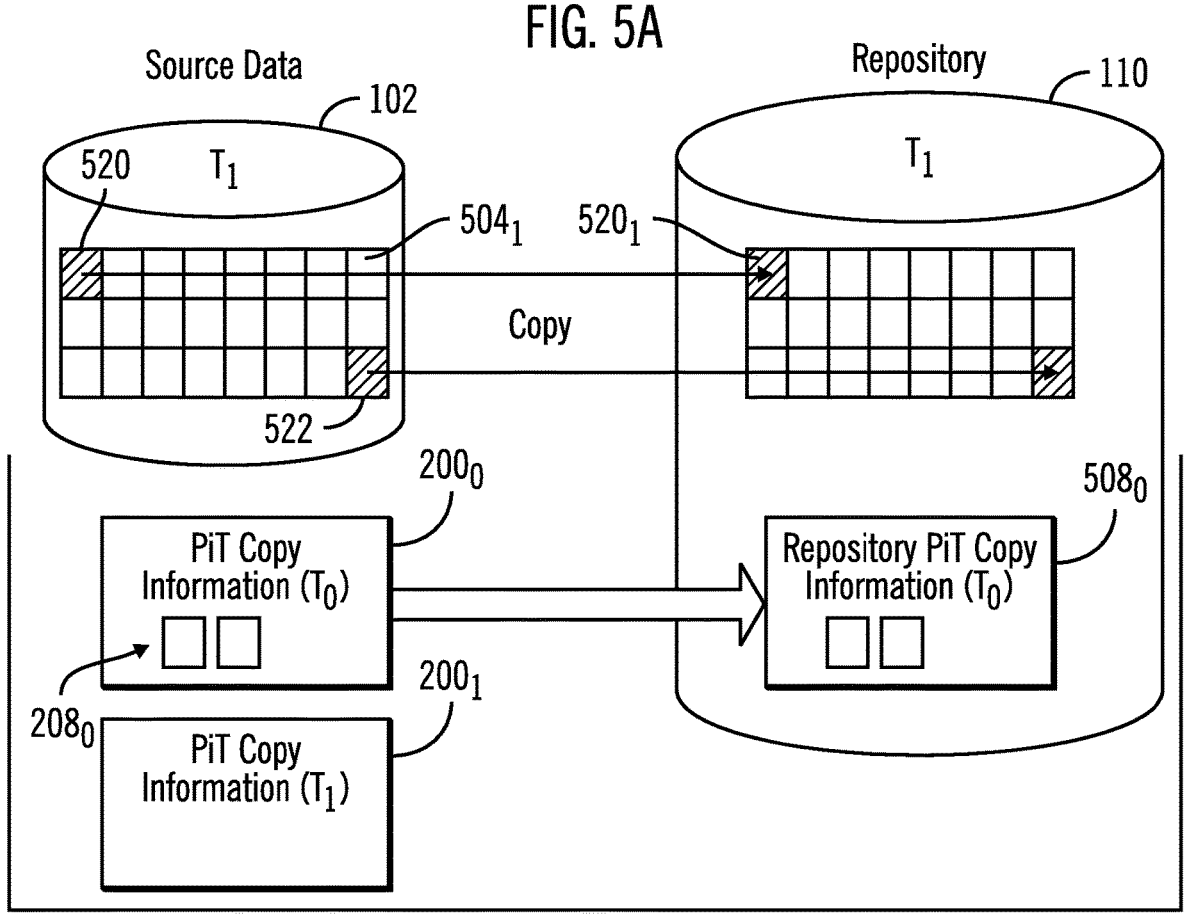
Figure 5C:
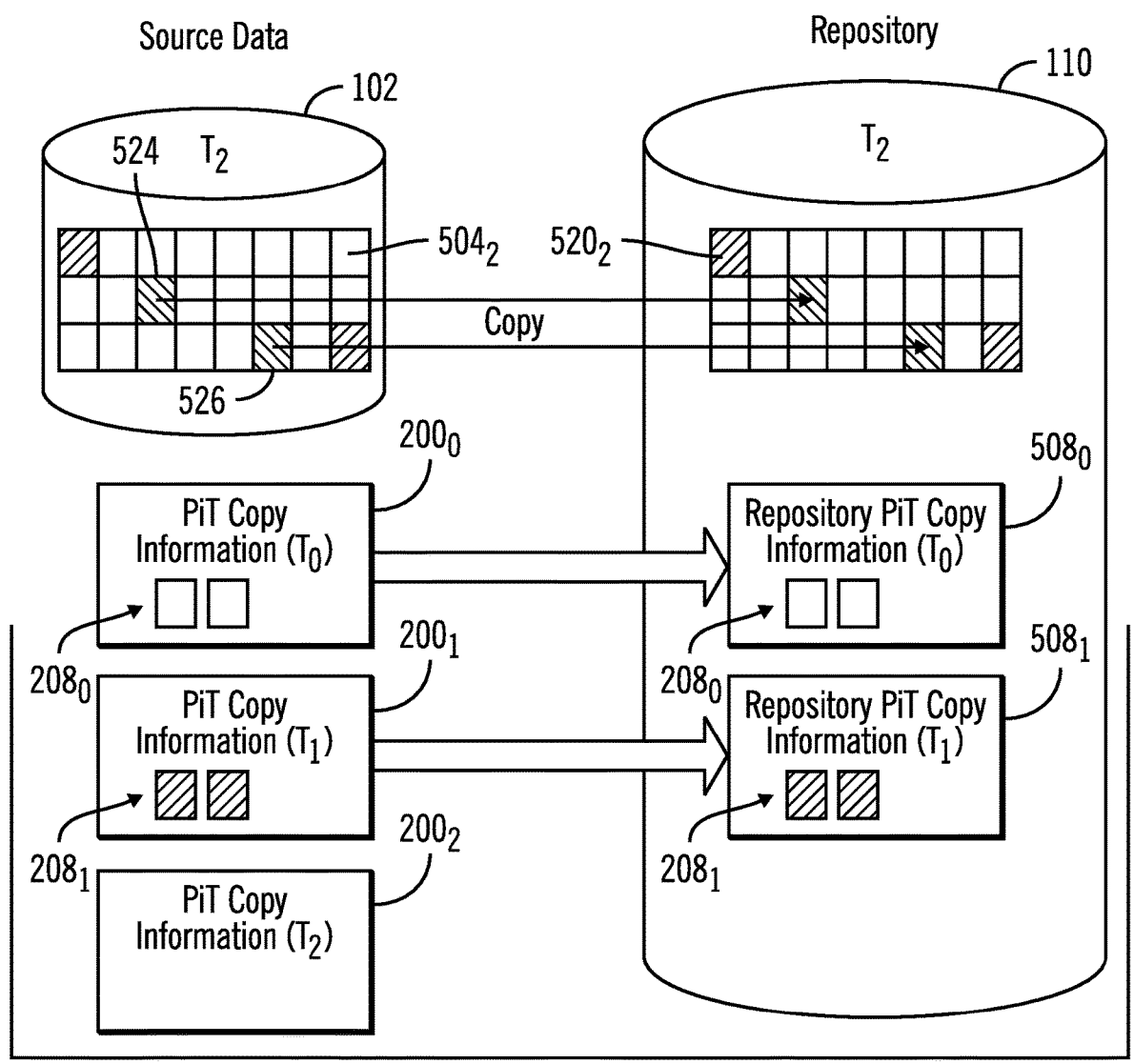

FIGS. 5a, 5b, 5c illustrate an example of the operations of FIG. 4 to create the full copy 120 and repository PiT copy information 200b. FIG. 5a shows the state at an initial time $T_0$ of the source data $504_0$ in the source storage 102 that is copied to a full copy 520 in the repository 110. Further, a PiT copy $200_0$ is created at the initial time $T_0$ to capture the source data at the initial time $T_0$ that is changed following the initial time and store as changed data 208 at the storage controller 100.

FIG. 5b shows a time $T_1$ when a second PiT copy at $T_1$ $200_1$ is created, which may result in the completion or freezing of the PiT copy at $T_0$ having changed data $208_0$ as of the point-in-time $T_0$ before changes occurring between $T_0$ and $T_1$. The repository copy manager 108 copies the changed data between $T_0$ and $T_1$, shown as units 520 and 522, to the repository 110 to update the full copy $520_1$ to have data as of $T_1$. Further, the completed, or frozen, PiT copy information $200_0$ at $T_0$ having the changed data $208_0$ as of $T_0$, before being updated, is copied to the repository 110 to store as repository PiT copy $608_0$.

FIG. 5c shows a time $T_2$ when a third PiT copy at $T_2$ $200_2$ is created, which may result in the completion or freezing of the PiT copy $200_1$ at $T_1$ having changed data $208_1$ as of the point-in-time $T_1$ before changes occurring between $T_1$ and $T_2$. The repository copy manager 108 copies the changed data between $T_1$ and $T_2$, shown as 524 and 526, to the repository 110 to update the full copy $520_2$ to have data as of $T_2$. Further, the completed, or frozen, PiT copy information $200_1$ at $T_1$ having the changed data $208_1$, as of $T_1$ before being updated, is copied to the repository 110 to store as repository PiT copy $508_1$.

Figure 6:
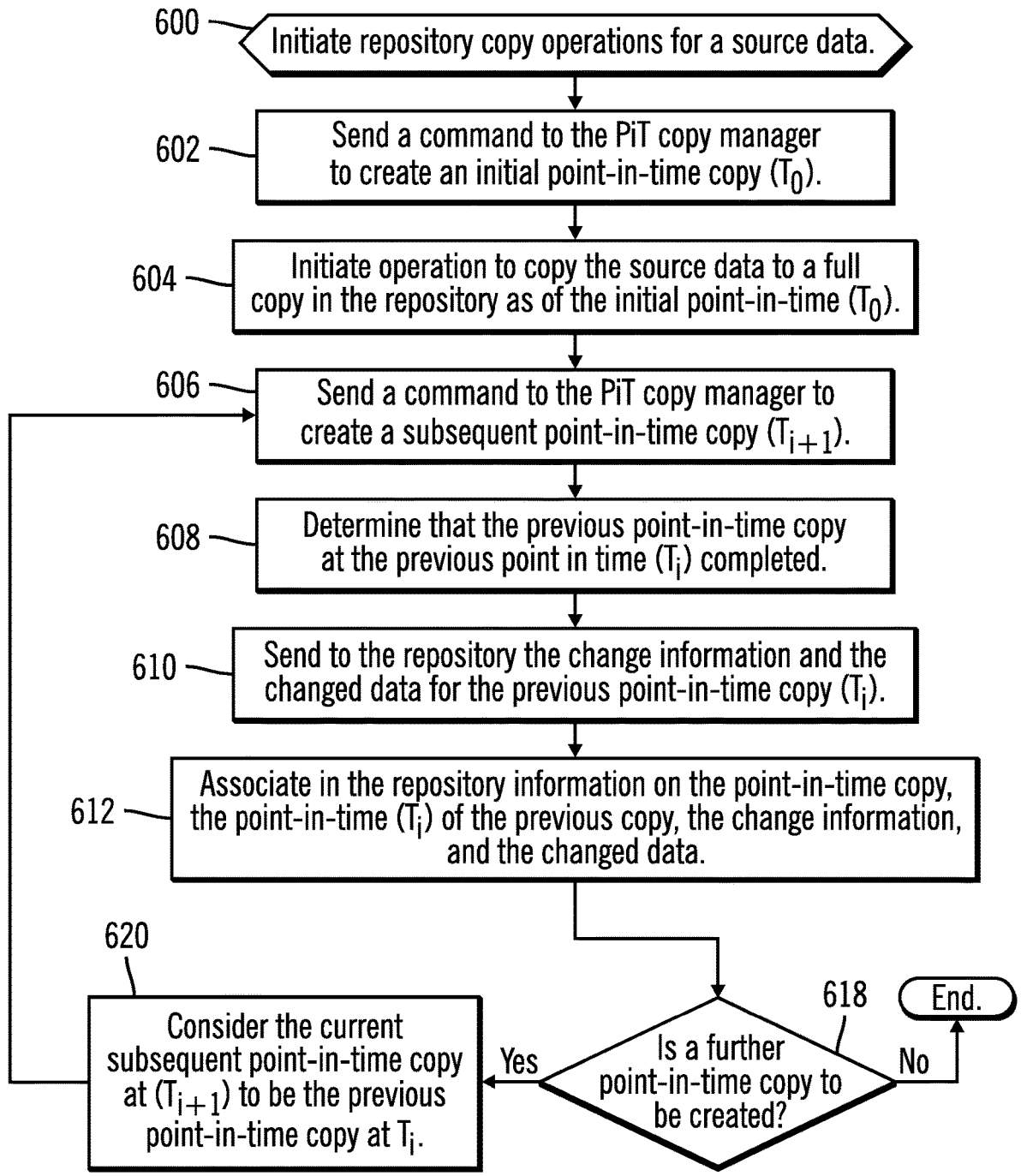

FIG. 6 illustrates an alternative embodiment where the changed PiT data 208 is not applied to the full copy 110 as done in block 412 of FIG. 4. Instead, in this alternative embodiment, the full copy 120 remains in its initial state following the first PiT copy at $T_0$. Blocks 600, 602, 604, 606, 608, 610, 612, 618, and 620 of FIG. 6 comprise the operations of blocks 400, 402, 404, 406, 408, 410, 412, 418, and 420 in FIG. 4, except that the full copy remains at its initial state including only data from the first PiT copy at $T_0$.

In a still further embodiment, the full copy 120 may be maintained at a point-in-time between the initial point-in-time $T_0$ and the current point-in-time $T_C$ of the most recent PiT copy. In such case, the restore operation may involve rolling forward or rolling back the full copy 120 from PiT copies before or after the restore time, respectively.

Figure 7:
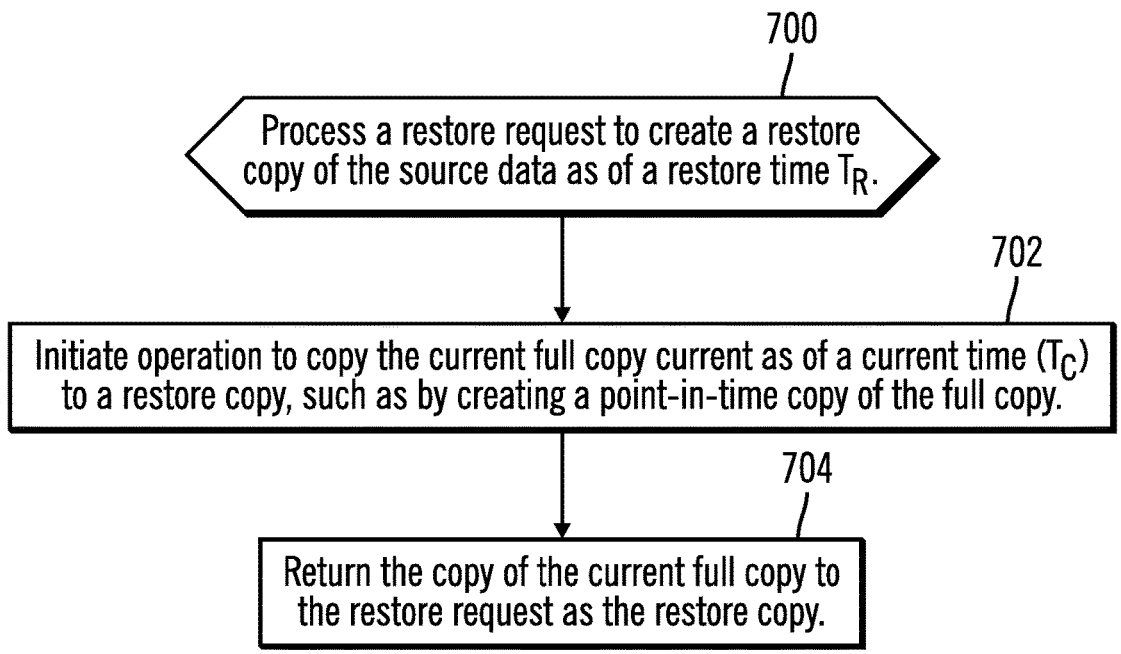
FIG. 7 illustrates an embodiment of operations to create a restore copy.

FIG. 7 illustrates an embodiment of operations performed by the repository copy manager 108 to create a restore copy 124 from the repository 110 as of a restore time ($T_R$), which may comprise a point-in-time of one of the repository point-in-time copies $200_b$. Upon processing (at block 700) a restore request to create a restore copy of the source data as of the restore time ($T_R$), the restore copy manager 108 initiates (at block 702) an operation to copy the current full copy 120 current as of a current time ($T_C$) to a restore copy 124. In one embodiment, the restore copy 124 may comprise an instantaneous PiT copy of the full copy 120. In certain system states, the full copy point-in-time $T_C$ may be different from the restore time ($T_R$), although the user views the restore copy 124 as being consistent as of the restore time ($T_R$). The repository copy manager 108 returns the copy of the current full copy 120 to the restore request as the restore copy 124. In this way, the restore operation takes only the time to create a point-in-time copy of the full copy 120 even though the data in the full copy 120 may be at a different time than the restore time ($T_R$) that is expected of the restore copy 124.

In an embodiment where the full copy 120 is updated with changed data, such as at block 414 in FIG. 1, when completing a new PiT copy, the restore time ($T_R$) may be at a point-in-time at the restore time ($T_R$) or before the point-in-time of the full copy 120. In the embodiment where the full copy 120 is not updated with changed data, such as in the embodiment of FIG. 6, the restore time may be at a point-in-time at the restore time ($T_R$) or after the point-in-time of the full copy 120. In an embodiment where the full copy 120 is updated with changed data but not form the most recent PiT copy, the restore time (TR) may be at a point-in-time at the restore time ($T_R$) or at a point-in-time before or after the point-in-time of the full copy 120.

Figure 8:
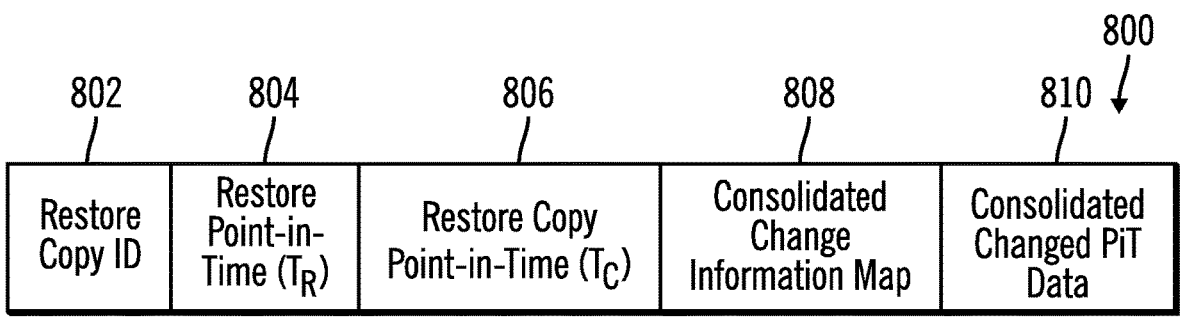
FIG. 8 illustrates an embodiment of restore copy metadata.

In certain embodiments, the repository copy manager 108 may create restore copy metadata 800 as shown in FIG. 8 when creating the restore copy 124, which includes: a restore copy identifier (ID) 802 identifying the restore copy; a restore point-in-time ($T_R$) 804 the user selected to create the restore copy 124; a restore copy point-in-time ($T_C$) 806 of the point-in-time of the full copy 120 from which the restore copy was created; consolidated change information map 808 indicating data units in the restore copy 124 that are indicated in change information 206 for PiT copies 200*b* as changed from the time of the restore time ($T_R$) 804 to the time of the restore copy point-in-time ($T_C$) 806, where $T_R$ may be equal to, greater than or less than $T_C$; consolidated changed PiT data 810 indicating the changed PiT data in PiT copies 200*b* from the restore point-in-time 804 to the restore copy 806 point-in-time. If there are changed point-in-time data for multiple point-in-time copies for one data unit in the source data, then the consolidated changed point-in-time data indicates the changed point-in-time data for the data unit for the point-in-time copy having a point-in-time closest to the restore point-in-time 804.

Figure 9:
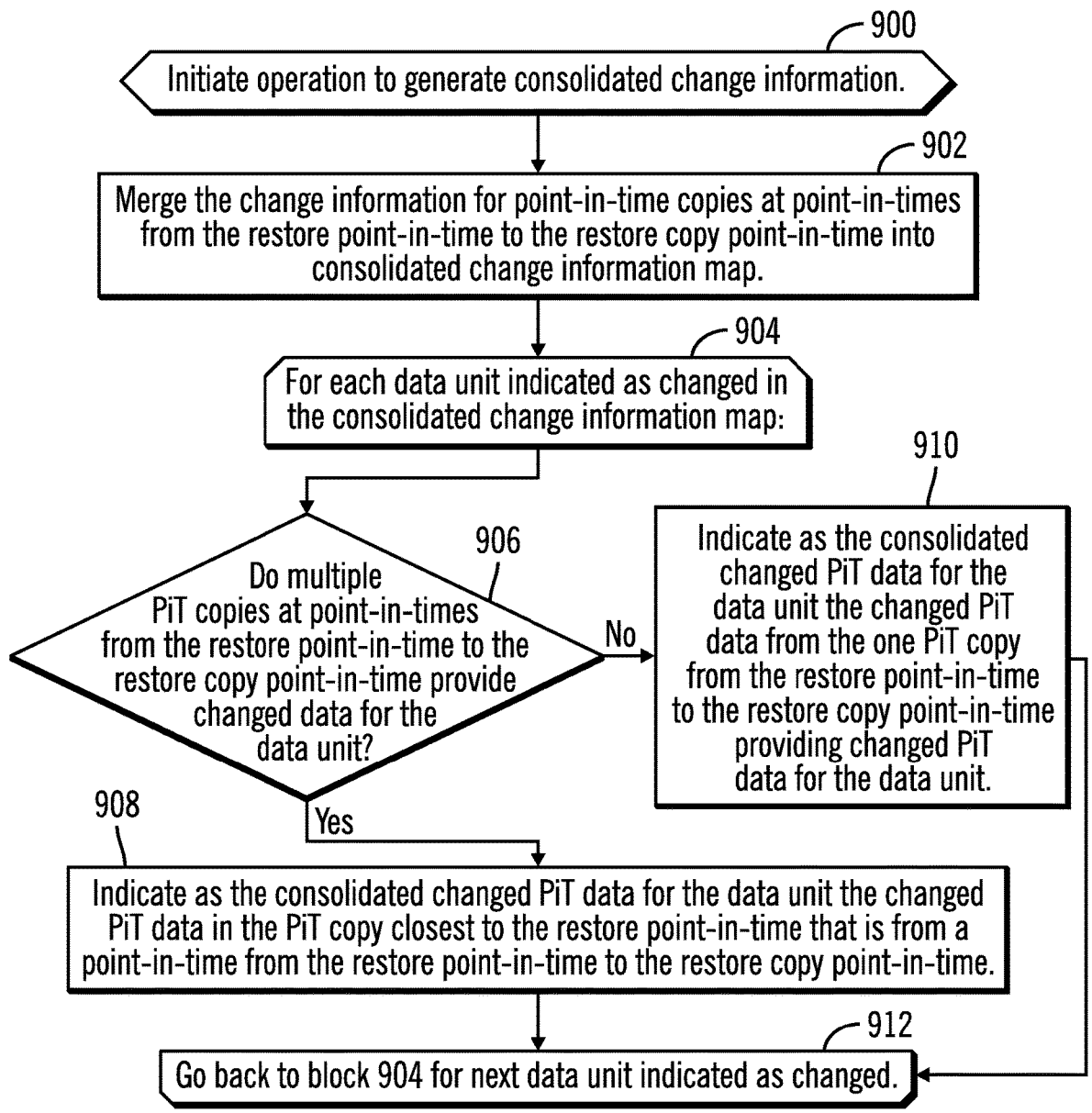
FIG. 9 illustrates an embodiment of operations go generate consolidated change information.

FIG. 9 illustrates an embodiment of operations performed by the repository copy manager 108 to generate consolidated PiT information for a restore copy 124, including the consolidated change information map 808 and the consolidated changed PiT data 810. Upon initiating (at block 900) operations to generate consolidated change information 808, 810, the repository copy manager 108 merges (at block 902) the change information bitmaps 206 for PiT-time copies at point-in-times from the restore point-in-time 804 to the restore copy point-in-time 806 into a consolidated change information map 808, e.g., bitmap, indicating the data units that have changed between the restore point in time 804 and the restore copy point-in-time 806, which occurs because the restore copy 124 was created as an instant PiT copy of the full copy 120. For each data unit indicated as changed in the consolidated change information map 808 a loop of operations (at blocks 904 through 912) is performed. If (at block 906) there are multiple PiT copies, at point-in-times from the restore point-in-time 804 to the restore copy point-in-time 806 that provide changed data, then the repository copy manager 108 indicates (at block 908) as the consolidated changed PiT data 810 for the data unit the changed PiT data in the PiT copy closest in time to the restore point-in-time 804 that is from a point-in-time from the restore point-in-time 804 to the restore copy point-in-time 806. If (at block 906) there is only one PiT copy providing changed data for the data unit, then the repository copy manager 108 indicates (at block 910) as the consolidated changed PiT data for the data unit the changed PiT data from the one PiT copy from the restore point-in-time 804 to the restore copy point-in-time 806 providing changed PiT data for the data unit.

In an alternative embodiment, the repository copy manager 108 may determine the changed data from PiT copy on the fly by determining the PiT copy between the restore point-in-time 804 and the restore copy point-in-time 806 closest to the restore point-in-time 804.

Figure 10:
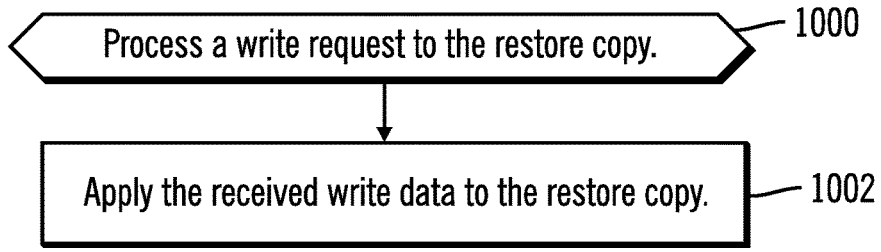
FIG. 10 illustrates an embodiment of operations to process a write request to a restore copy.

FIG. 10 illustrates an embodiment of operations performed by the restore copy I/O manager 126 to process a write request to the restore copy 124. Upon processing (at block 1000) a write request to the restore copy, the received write data is applied (at block 1002) to the restore copy 124.

Figure 11:
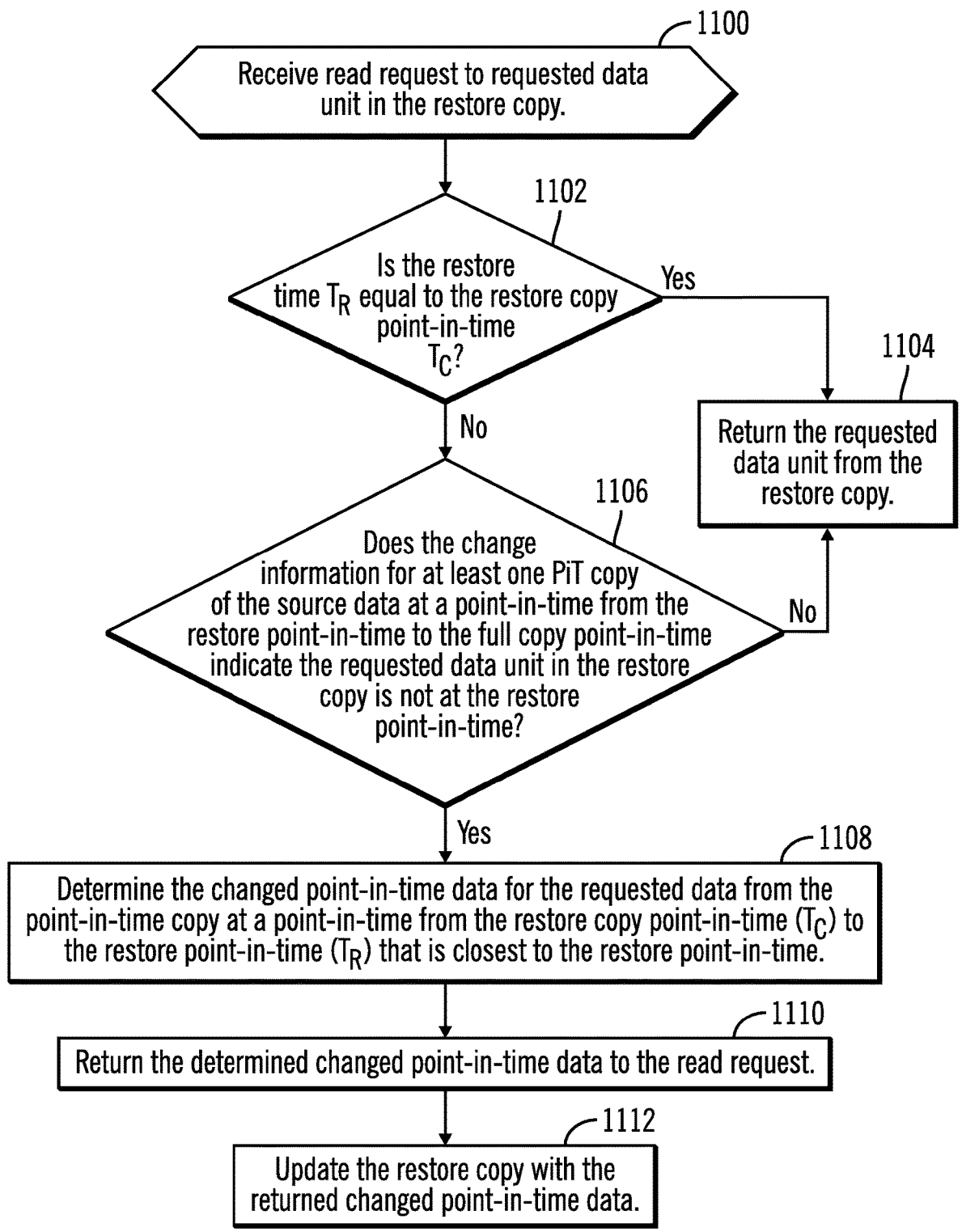
FIG. 11 illustrates an embodiment of operations to process a read request to the restore copy.

FIG. 11 illustrates an embodiment of operations performed by the restore copy I/O manager 126 to process a read request to a requested data unit in the restore copy 124. Upon processing (at block 1100) the read request to a data unit in the restore copy 124, if (at block 1102) the restore point-in-time 804 is equal to the restore copy point-in-time 806, then the requested data unit is returned (at block 1104) from the restore copy 124. The restore copy 124 itself may have the data, or if the restore copy 124 is a PiT copy of the full copy 120, the data may have to be retrieved from the full copy 120. Otherwise, if (at block 1102) the re restore point-in-time 804 is not equal to the restore copy point-in-time 806, then the restore copy I/O manager 126 determines (at block 1106) whether the change information 206 for at least one PiT copy of the source data at a point-in-time from the restore point-in-time 804 to the restore copy point-in-time 806 indicate the requested data unit in the restore copy is not at the restore point-in-time. In certain embodiments, this determination may be made from a consolidated change information map 808. If (at block 1106) the requested data unit has not been changed from the time of the restore point-in-time 804 to the restore copy point-in-time 806, then control proceeds to block 1104 to return the requested data unit from the restore copy 124.

Otherwise, if (at block 1106) the requested data unit has changed from the time of restore point-in-time 804 to the restore copy point-in-time 806, then the restore copy I/O manager 126 determines (at block 1108) the changed point-in-time data for the requested data from the repository PiT copy 200*b* at a point-in-time from the restore copy point-in-time 806 ($T_C$) to the restore point-in-time ($T_R$) 808 that is closest in time to the restore point-in-time 808. In embodiments where consolidated change information 808, 810 is used, the changed PiT data for the requested data unit may be determined from consolidated changed PiT data 810 for the requested data. This determined changed PiT data closest to the restore point-in-time 804 is returned (at block 1110) to the read request. In certain embodiments, the restore copy 124 may be updated (at block 1112) with the returned changed point-in-time data 112, such as a copy-on-read information. In other embodiments, the changed PiT data may not be copied to the restore copy 124.

With the described embodiments, the restore copy 124 may be generated almost instantaneously from the current full copy 120 in the repository 110 even if the point-in-time at which the full copy 120 is current ($T_C$) is different from the restore copy point-in-time ($T_R$). Upon processing read request, the repository PiT copies 200*b* may be used to determine whether requested read data from the restore copy 124 is at the restore copy point-in-time 804 to determine whether to return requested data from the restore copy 124 or one of the repository PiT copies 200*b* between the restore copy point-in-time 806 and the restore time 804.

Figure 12:
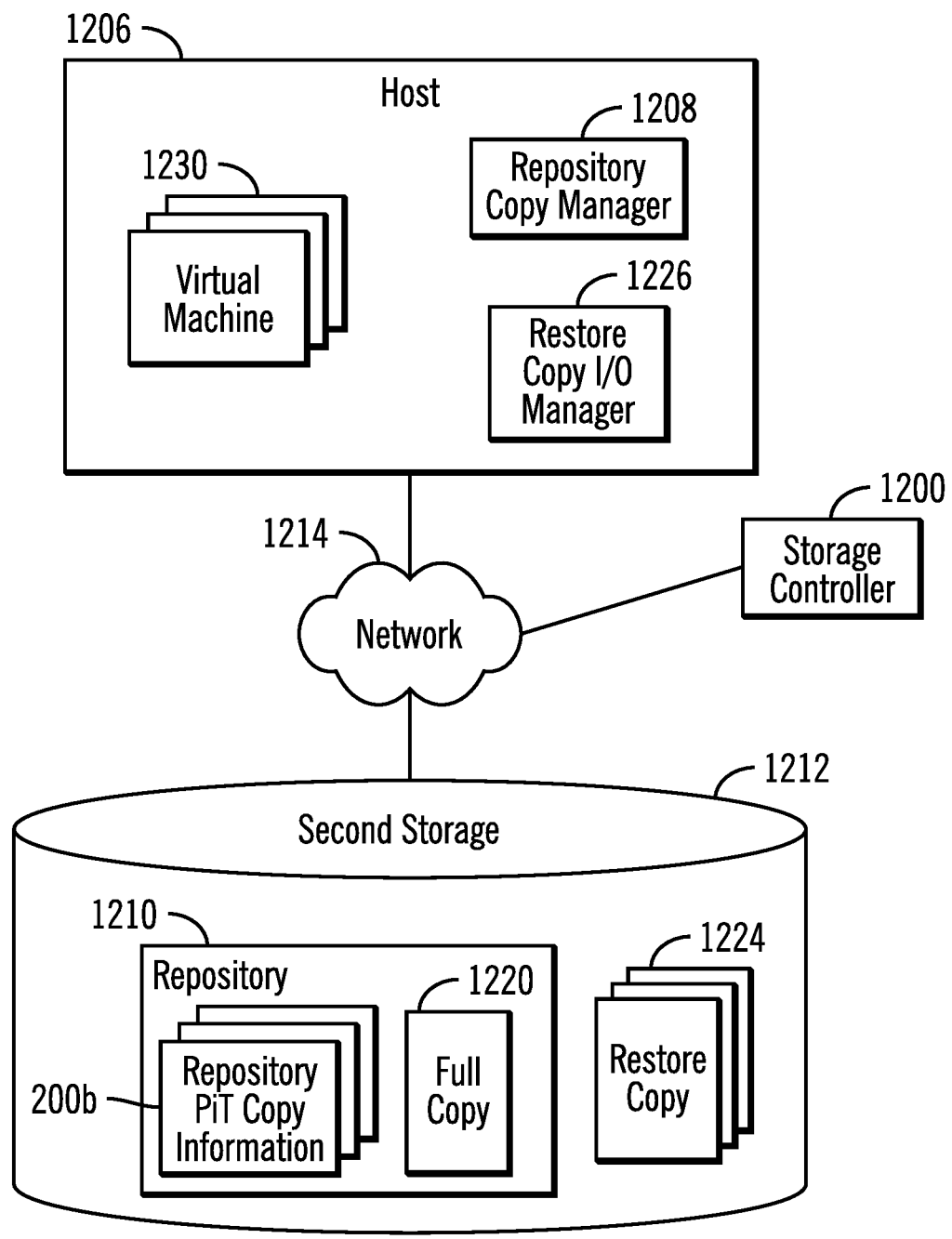
FIG. 12 illustrates an embodiment of a storage environment including virtual machines.

FIG. 12 illustrates an embodiment in which the host 1206 implements a plurality of virtual machines 1230 for which different restore copies 1224 are created for use by the different virtual machines 1230. Elements 1200, 1206, 1208, 1214, 1226, 1210, 1212, 1220, 1224 and 200*b* in FIG. 12 are the same as corresponding elements 100, 106, 114, 108, 126, 110, 112, 120, 124, and 200*b* described with respect to FIG. 1. However, in FIG. 12, the repository copy manager 1208 creates restore copies 1224 for the different virtual machines 1230 to use and the restore copy I/O manager 1226 manages virtual machine 1230 read and write requests to their respective restore copies 1224 as discussed with respect to the restore copy I/O manager 126. In an alternative embodiment, each virtual machine 1230 may include its own instantiation of the repository copy manager 1208 and the restore copy I/O manager 1226. In this way, the different virtual machines 1230 may access their own separate restore copies 1224, and receive data as of the restore point-in-time ($T_R$) from the repository PiT copy information 200*b* if needed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 13:
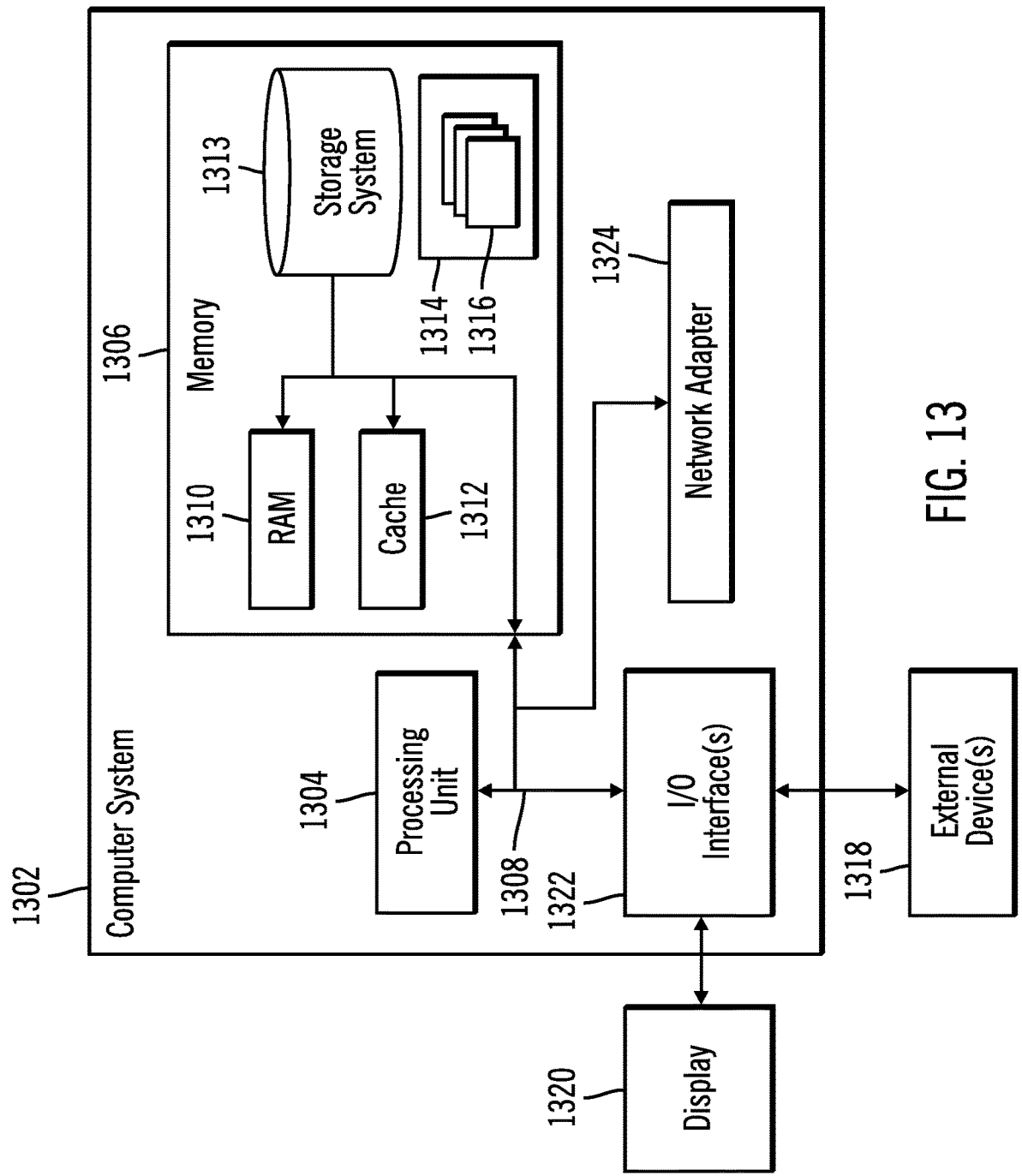
FIG. 13 illustrates a computing environment in which the components of FIGS. 1 and 12 may be implemented.

The computational components of FIG. 1 and FIG. 12, including the storage controller 100, 1200 and host 106, 1206 may be implemented in one or more computer systems, such as the computer system 1302 shown in FIG. 13. Computer system/server 1302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, the computer system/server 1302 is shown in the form of a general-purpose computing device. The components of computer system/server 1302 may include, but are not limited to, one or more processors or processing units 1304, a system memory 1306, and a bus 1308 that couples various system components including system memory 1306 to processor 1304. Bus 1308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1302 typically includes a variety of computer system readable media. Such media may be any available media that is accessible by computer system/server 1302, and it includes both volatile and non-volatile media, removable and non-removable media.

System memory 1306 can include computer system readable media in the form of volatile memory, such as random access memory (RAM) 1310 and/or cache memory 1312. Computer system/server 1302 may further include other removable/non-removable, volatile/non-volatile computer system storage media. By way of example only, storage system 1313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1308 by one or more data media interfaces. As will be further depicted and described below, memory 1306 may include at least one program product having a set (e.g., at least one) of program modules that are configured to carry out the functions of embodiments of the invention.

Program/utility 1314, having a set (at least one) of program modules 1316, may be stored in memory 1306 by way of example, and not limitation, as well as an operating system, one or more application programs, other program modules, and program data. Each of the operating system, one or more application programs, other program modules, and program data or some combination thereof, may include an implementation of a networking environment. The components of the computer 1302 may be implemented as program modules 1316 which generally carry out the functions and/or methodologies of embodiments of the invention as described herein. The systems of FIGS. 1 and 12 may be implemented in one or more computer systems 1302, where if they are implemented in multiple computer systems 1302, then the computer systems may communicate over a network.

Computer system/server 1302 may also communicate with one or more external devices 1318 such as a keyboard, a pointing device, a display 1320, etc.; one or more devices that enable a user to interact with computer system/server 1302; and/or any devices (e.g., network card, modem, etc.) that enable computer system/server 1302 to communicate with one or more other computing devices. Such communication can occur via Input/Output (I/O) interfaces 1322. Still yet, computer system/server 1302 can communicate with one or more networks such as a local area network (LAN), a general wide area network (WAN), and/or a public network (e.g., the Internet) via network adapter 1324. As depicted, network adapter 1324 communicates with the other components of computer system/server 1302 via bus 1308. It should be understood that although not shown, other hardware and/or software components could be used in conjunction with computer system/server 1302. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for maintaining source data in a repository, wherein the computer program product comprises a computer readable storage medium having program instructions embodied therewith, the program instructions executable by a processor to cause operations, the operations comprising:
   maintaining a repository having a full copy of source data as of a full copy point-in-time;
   receiving a restore request to restore the source data as of a restore point-in-time different from the full copy point-in-time;
   creating a point-in-time copy of the full copy of the source data in response to the restore request, wherein the point-in-time copy of the full copy is completed after generating a relationship data structure without copying the source data; and
   returning the created point-in-time copy of the full copy of the source data as a restore copy to the restore request, wherein the creating of the restore copy takes an amount of time to create the point-in-time copy of the full copy without copying of the source data, wherein the restore copy comprising the point-in-time copy of the full copy is at the full copy point-in-time that is different from the restore point-in-time; and
   providing restore copy metadata that indicates two different point-in-times for the restore request comprising the full copy point-in-time of the point-in-time copy of the full copy that is returned as the restore copy and the restore point-in-time expected by the restore request.

2. The computer program product of claim 1, wherein the repository further includes for each of a plurality of point-in-time copies at different point-in-times of the source data, change information indicating changed data in the source data that changed between a point-in-time of the point-in-time copy and a subsequent point-in-time, and changed point-in-time data comprising data in the source data as of the point-in-time of the point-in-time copy indicated in the change information as changed, wherein the operations further comprise:
   receiving a read request directed to requested data in the restore copy;
   determining, from the change information for at least one of the point-in-time copies of the source data at a point-in-time from the restore point-in-time to the full copy point-in-time, whether the requested data in the restore copy is not at the restore point-in-time; and
   returning the requested data from the changed point-in-time data for one of the point-in-time copies at a point-in-time from the restore point-in-time to the full copy point-in-time in the repository in response to determining that the requested data in the restore copy is not at the restore point-in-time.

3. The computer program product of claim 2, wherein the operations further comprise:
   returning the requested data from the restore copy in response to determining that the requested data in the restore copy is at the restore point-in-time.

4. The computer program product of claim 2, wherein the operations further comprise:
   copying the requested data from the changed point-in-time data returned to the read request to the restore copy.

5. The computer program product of claim 2, wherein when multiple point-in-time copies provide changed point-in-time data for the requested data, the changed point-in-time data from the point-in-time copy having a point-in-time from the full copy point-in-time to the restore point-in-time and closest in time to the restore point-in-time is returned as the requested data.

6. The computer program product of claim 2, wherein the operations further comprise:
   generating consolidated change information indicating changed point-in-time data for the point-in-time copies from the restore point-in-time to the full copy point-in-time, wherein if there are changed point-in-time data for multiple point-in-time copies for one data unit in the source data, then the consolidated change information indicates the changed point-in-time data for the data unit for the point-in-time copy having a point-in-time closest to the restore point-in-time, wherein the returning the requested data from the changed point-in-time data for one of the point-in-time copies comprises returning the requested data from the changed point-in-time data indicated in the consolidated change information for the data unit.

7. The computer program product of claim 2, wherein the full copy point-in-time is at one of an earliest point-in-time, a latest point-in-time, and an intermediate point-in-time between the earliest and the latest point-in-times of the point-in-time copies of the source data in the repository.

8. The computer program product of claim 1, wherein the operations further comprise:
receiving writes directed to the restore copy;
applying the writes to update the restore copy;
receiving a read request for requested data in the restore copy updated by the writes; and
returning data for the requested data from changed point-in-time data for a point-in-time copy in the repository to return requested data as of the restore point-in-time.

9. The computer program product of claim 1, wherein point-in-time copies of the full copy of the source data are created for multiple restore requests from multiple virtual machines, wherein, for each of the virtual machines, operations are performed comprising:
receiving a read request from a requesting virtual machine comprising one of the virtual machines directed to requested data in a restore copy for the requesting virtual machine;
determining, from change information for at least one of the point-in-time copies of the source data, whether the requested data in the restore copy for the requesting virtual machine is not at the restore point-in-time; and
returning the requested data from changed point-in-time data for one of the point-in-time copies in the repository to the requesting virtual machine in response to determining that the requested data in the restore copy is not at the restore point-in-time.

10. A system for maintaining source data in a repository, comprising:
a processor; and
a computer readable storage medium including program instructions executed by the processor to perform operations, the operations comprising:
maintaining a repository having a full copy of source data as of a full copy point-in-time;
receiving a restore request to restore the source data as of a restore point-in-time different from the full copy point-in-time;
creating a point-in-time copy of the full copy of the source data in response to the restore request, wherein the point-in-time copy of the full copy is completed after generating a relationship data structure without copying the source data;
returning the created point-in-time copy of the full copy of the source data as a restore copy to the restore request, wherein the creating of the restore copy takes an amount of time to create the point-in-time copy of the full copy without copying of the source data, wherein the restore copy comprising the point-in-time copy of the full copy is at the full copy point-in-time that is different from the restore point-in-time; and
providing restore copy metadata that indicates two different point-in-times for the restore request comprising the full copy point-in-time of the point-in-time copy of the full copy that is returned as the restore copy and the restore point-in-time expected by the restore request.

11. The system of claim 10, wherein the repository further includes for each of a plurality of point-in-time copies at different point-in-times of the source data, change information indicating changed data in the source data that changed between a point-in-time of the point-in-time copy and a subsequent point-in-time, and changed point-in-time data comprising data in the source data as of the point-in-time of the point-in-time copy indicated in the change information as changed, wherein the operations further comprise:
receiving a read request directed to requested data in the restore copy;
determining, from the change information for at least one of the point-in-time copies of the source data at a point-in-time from the restore point-in-time to the full copy point-in-time, whether the requested data in the restore copy is not at the restore point-in-time; and
returning the requested data from the changed point-in-time data for one of the point-in-time copies at a point-in-time from the restore point-in-time to the full copy point-in-time in the repository in response to determining that the requested data in the restore copy is not at the restore point-in-time.

12. The system of claim 11, wherein the operations further comprise:
returning the requested data from the restore copy in response to determining that the requested data in the restore copy is at the restore point-in-time.

13. The system of claim 11, wherein the operations further comprise:
generating consolidated change information indicating changed point-in-time data for the point-in-time copies from the restore point-in-time to the full copy point-in-time, wherein if there are changed point-in-time data for multiple point-in-time copies for one data unit in the source data, then the consolidated change information indicates the changed point-in-time data for the data unit for the point-in-time copy having a point-in-time closest to the restore point-in-time, wherein the returning the requested data from the changed point-in-time data for one of the point-in-time copies comprises returning the requested data from the changed point-in-time data indicated in the consolidated change information for the data unit.

14. The system of claim 10, wherein the operations further comprise:
receiving writes directed to the restore copy;
applying the writes to update the restore copy;
receiving a read request for requested data in the restore copy updated by the writes; and
returning data for the requested data from changed point-in-time data for a point-in-time copy in the repository to return requested data as of the restore point-in-time.

15. The system of claim 10, wherein point-in-time copies of the full copy of the source data are created for multiple restore requests from multiple virtual machines, wherein, for each of the virtual machines, operations are performed comprising:
receiving a read request from a requesting virtual machine comprising one of the virtual machines directed to requested data in a restore copy for the requesting virtual machine;
determining, from change information for at least one of the point-in-time copies of the source data, whether the requested data in the restore copy for the requesting virtual machine is not at the restore point-in-time; and returning the requested data from changed point-in-time data for one of the point-in-time copies in the repository to the requesting virtual machine in response to determining that the requested data in the restore copy is not at the restore point-in-time.

16. A method, comprising:

maintaining a repository having a full copy of source data as of a full copy point-in-time;

receiving a restore request to restore the source data as of a restore point-in-time different from the full copy point-in-time;

creating a point-in-time copy of the full copy of the source data in response to the restore request, wherein the point-in-time copy of the full copy is completed after generating a relationship data structure without copying the source data; and returning the created point-in-time copy of the full copy of the source data as a restore copy to the restore request, wherein the creating of the restore copy takes an amount of time to create the point-in-time copy of the full copy without copying of the source data, wherein the restore copy comprising the point-in-time copy of the full copy is at the full copy point-in-time that is different from the restore point-in-time; and providing restore copy metadata that indicates two different point-in-times for the restore request comprising the full copy point-in-time of the point-in-time copy of the full copy that is returned as the restore copy and the restore point-in-time expected by the restore request.

17. The method of claim 16, wherein the repository further includes for each of a plurality of point-in-time copies at different point-in-times of the source data, change information indicating changed data in the source data that changed between a point-in-time of the point-in-time copy and a subsequent point-in-time, and changed point-in-time data comprising data in the source data as of the point-in-time of the point-in-time copy indicated in the change information as changed, further comprising:

receiving a read request directed to requested data in the restore copy;

determining, from the change information for at least one of the point-in-time copies of the source data at a point-in-time from the restore point-in-time to the full copy point-in-time, whether the requested data in the restore copy is not at the restore point-in-time; and returning the requested data from the changed point-in-time data for one of the point-in-time copies at a point-in-time from the restore point-in-time to the full copy point-in-time in the repository in response to determining that the requested data in the restore copy is not at the restore point-in-time.

18. The method of claim 17, further comprising:

returning the requested data from the restore copy in response to determining that the requested data in the restore copy is at the restore point-in-time.

19. The method of claim 17, further comprising:

generating consolidated change information indicating changed point-in-time data for the point-in-time copies from the restore point-in-time to the full copy point-in-time, wherein if there are changed point-in-time data for multiple point-in-time copies for one data unit in the source data, then the consolidated change information indicates the changed point-in-time data for the data unit for the point-in-time copy having a point-in-time closest to the restore point-in-time, wherein the returning the requested data from the changed point-in-time data for one of the point-in-time copies comprises returning the requested data from the changed point-in-time data indicated in the consolidated change information for the data unit.

20. The method of claim 16, further comprising:

receiving writes directed to the restore copy;

applying the writes to update the restore copy;

receiving a read request for requested data in the restore copy updated by the writes; and returning data for the requested data from changed point-in-time data for a point-in-time copy in the repository to return requested data as of the restore point-in-time.

21. The method of claim 16, wherein point-in-time copies of the full copy are created for multiple restore requests from multiple virtual machines, wherein, for each of the virtual machines, operations are performed comprising:

receiving a read request from a requesting virtual machine comprising one of the virtual machines directed to requested data in a restore copy for the requesting virtual machine;

determining, from change information for at least one of the point-in-time copies of the source data, whether the requested data in the restore copy for the requesting virtual machine is not at the restore point-in-time; and returning the requested data from changed point-in-time data for one of the point-in-time copies in the repository to the requesting virtual machine in response to determining that the requested data in the restore copy is not at the restore point-in-time.

22. The computer program product of claim 1, wherein the restore point-in-time is before the full copy point-in-time when the full copy is updated with changed data at a point-in-time greater than the restore point-in-time, and wherein the restore point-in-time is greater than the full copy point-in-time when the full copy is not updated with changed data or updated with changed data at a point-in-time before the restore point-in-time.

23. The system of claim 10, wherein the restore point-in-time is before the full copy point-in-time when the full copy is updated with changed data at a point-in-time greater than the restore point-in-time, and wherein the restore point-in-time is greater than the full copy point-in-time when the full copy is not updated with changed data or updated with changed data at a point-in-time before the restore point-in-time.

24. The method of claim 16, wherein the restore point-in-time is before the full copy point-in-time when the full copy is updated with changed data at a point-in-time greater than the restore point-in-time, and wherein the restore point-in-time is greater than the full copy point-in-time when the full copy is not updated with changed data or updated with changed data at a point-in-time before the restore point-in-time.

* * * * *